May 28, 1935. C. E. BEDELL 2,003,129
CONTROL DEVICE FOR ROLLING MILLS
Filed Oct. 4, 1933 5 Sheets-Sheet 1
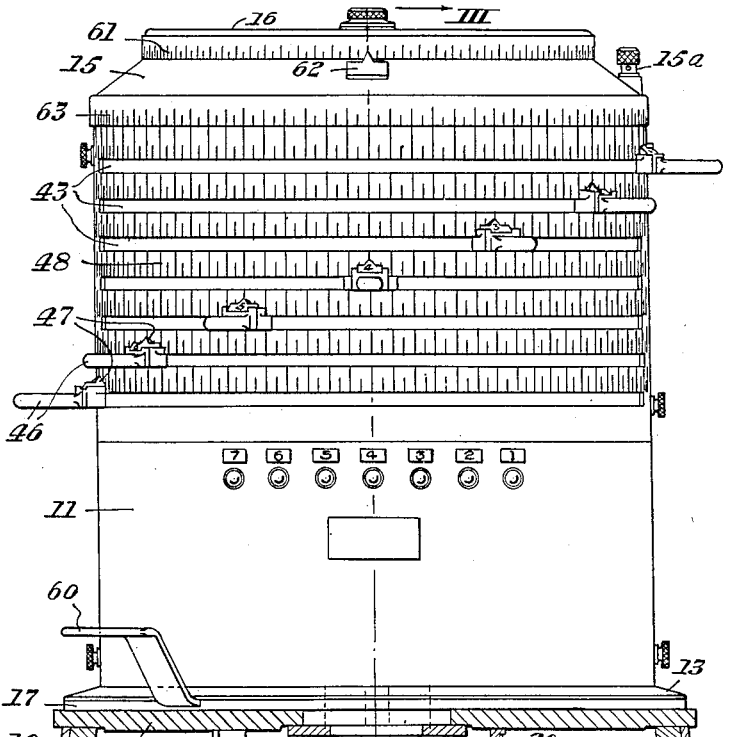
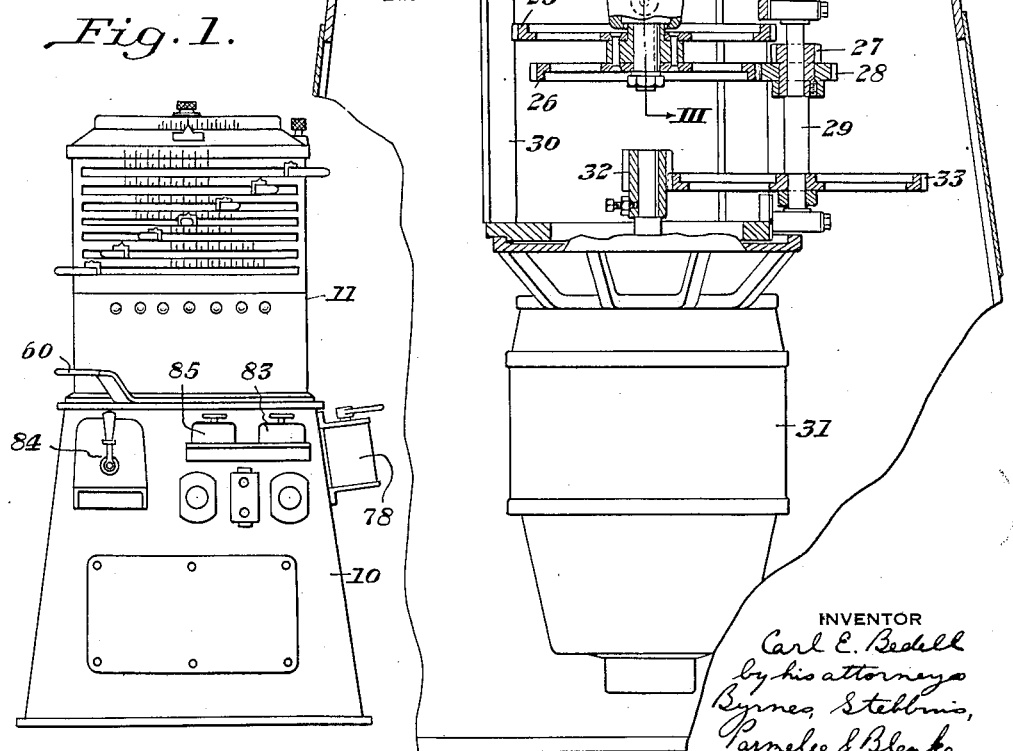
INVENTOR
Carl E. Bedell
by his attorneys
Byrnes, Stebbins,
Parmelee & Blenko

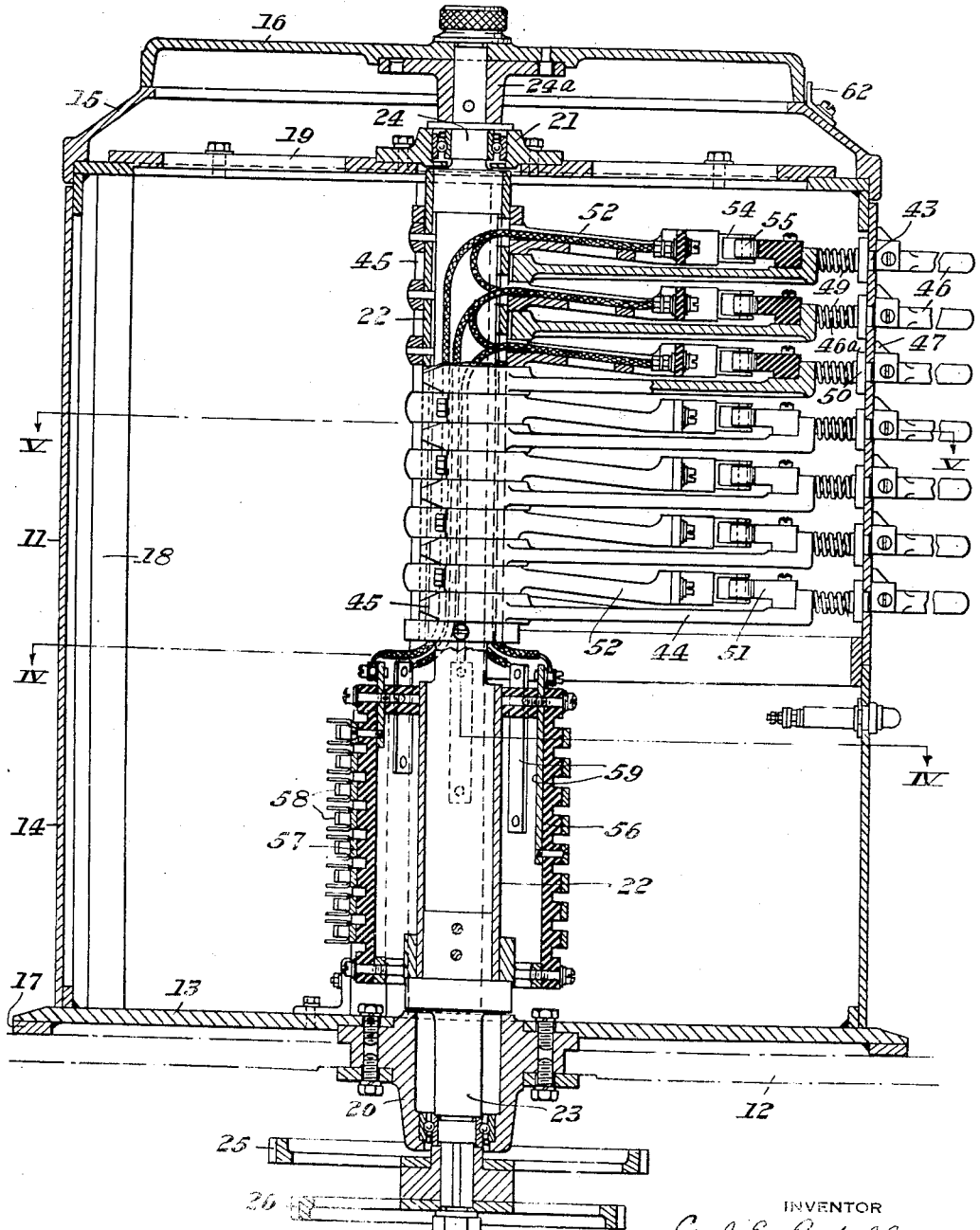

May 28, 1935.  C. E. BEDELL  2,003,129
CONTROL DEVICE FOR ROLLING MILLS
Filed Oct. 4, 1933   5 Sheets-Sheet 3

May 28, 1935.  C. E. BEDELL  2,003,129
CONTROL DEVICE FOR ROLLING MILLS
Filed Oct. 4, 1933   5 Sheets-Sheet 5

INVENTOR
Carl E. Bedell
by his attorneys
Byrnes, Stebbins,
Parmelee & Blenko

Patented May 28, 1935

2,003,129

UNITED STATES PATENT OFFICE 2,003,129

CONTROL DEVICE FOR ROLLING MILLS

Carl E. Bedell, Pittsburgh, Pa., assignor to Mesta Machine Company, Pittsburgh, Pa., a corporation of Pennsylvania Application October 4, 1933, Serial No. 692,118

16 Claims. (Cl. 80—56)

My invention relates to a device for electrically controlling a sequence of operations which it is desired to effect automatically. The invention has particular application to the control of the screwdowns of a sheet mill, although it is not limited thereto but has other possible applications.

It has been proposed heretofore to control automatically the operation of mill screws. It has not been possible, as far as I am aware, satisfactorily to control automatically the adjustment of the screws of a sheet mill. The control of sheet mill screws involves peculiar problems of its own because of the fairly wide range of adjustments which must be made, especially where it is desired to use the same mill for roughing and finishing, as well as the extreme precision which is necessary, especially in the final passes of a pack through the mill. A high degree of accuracy is required because packs are rolled to a given length and a slight error in the gauge of the roll pass effects a considerably larger error in the length of the pack after it passes through the mill. It is necessary, furthermore, that a device for automatically controlling sheet mill screws be capable of almost instant adjustment, not only as to the position of the rolling range on the gauge scale but also as to the gauge of the roll setting on successive passes of the material through the mill.

I have invented a control device of the character mentioned which makes possible for the first time, as far as I am aware, the automatic control of sheet mill screws. In accordance with my invention, I provide a rotatable shaft carrying a plurality of arms extending radially thereof, each arm having a switch thereon for stopping operation of the usual screw motor when the screws have been adjusted to a predetermined setting. The shaft is driven in conformity with the rotation of the mill screws. Relatively fixed cams are provided for operating the switches on the arms and the position of each cam can readily be adjusted relative to the others. It is possible, furthermore, to adjust the position of all the cams simultaneously so that limits of the control range may be shifted up or down.

For a complete understanding of the invention, reference is made to the accompanying drawings illustrating a present preferred embodiment. In the drawings:

Figure 1 is a side elevation;

Figure 2 is a view similar in part to Figure 1, on an enlarged scale, showing the drive for the control shaft in section;

Figure 3 is a sectional view along the line III—III of Figure 2;

Figure 4:
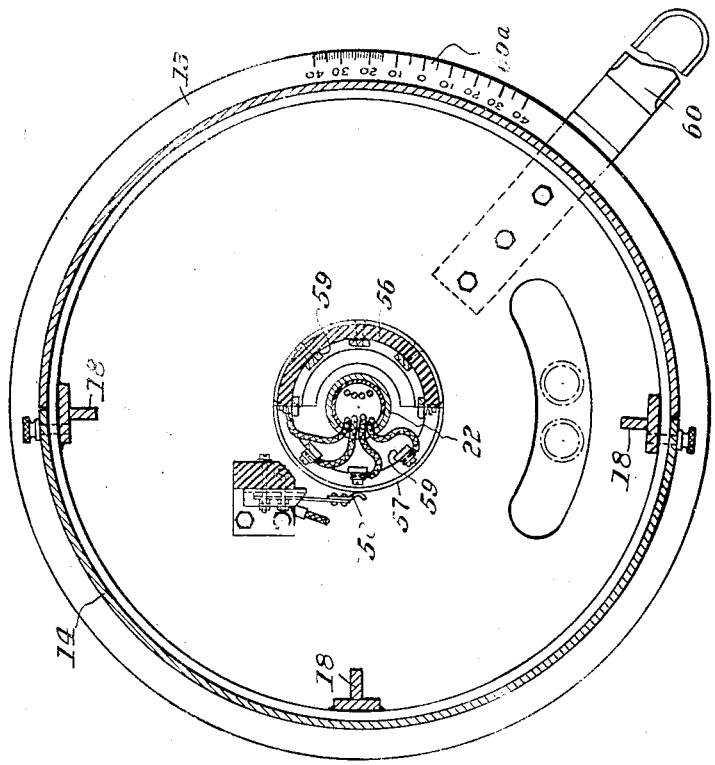
Figure 4 is a sectional view along the line IV—IV of Figure 3.

Referring now in detail to the drawings, the control device of my invention comprises a base 10 and a turret 11 rotatably mounted thereon. The details of the structure of the base 10 are not material to the invention, but the latter is preferably constituted by a structural frame having sheet metal walls attached thereto. A cover or top 12 is seated on the base, providing a platform for rotatably supporting the turret 11.

The turret 11, as shown particularly in Figures 2 and 3, comprises a bottom plate 13, a cylindrical side wall 14, a head 15 and a cap 16. A ring 17 is attached to the bottom plate 13 and has frictional engagement with the cover 12 of the base 10. The side wall 14 is assembled about a structural frame 18, on top of which is secured a spider 19. The head 15 is rotatably supported on the frame 18. The head 15 may be locked in one of two diametrically opposite positions by means of a retractible locking plunger 15a adapted to enter suitable recesses in the top of the frame 18.

A bearing cup 20 is attached to the bottom plate 13 and extends downwardly through the cover 12. A bearing cup 21 is secured to the spider 19. A tubular shaft 22 has trunnions 23 and 24 secured in its ends and the trunnions are seated in bearings in the cups 20 and 21, providing a rotatable mounting for the tubular shaft 22. The trunnion 23 has gears 25 and 26 secured thereto adjacent its lower end. The cap 16 is pinned and bolted to the upper end of the trunnion 24 by flange 24a.

The gears 25 and 26 are adapted to mesh with one or the other of pinions 27 and 28 formed as a unit and secured to a shaft 29. The shaft 29 is journaled in bearings carried by a suspension 30 on which is also supported a motor 31. The shaft of the motor 31 projects upwardly and has a pinion 32 thereon meshing with a gear 33, which is also secured to the shaft 29. The motor 31 is a polyphase, alternating current motor with wound rotor and constitutes the tell-tale end of a so-called Selsyn remote indicating system. The manner in which the motor 31 is driven can best be explained by reference to Figure 6.

The screws of the mill are illustrated diagrammatically at 34. The screws are driven for vertical movement through nuts 34a in the mill housing, by a screwdown motor 35. The drive for the screws includes double reduction gears 36 and 37, the gears 37 being connected by a shaft 38. Worm wheels 39 having slidable but non-rotatable mounting on the screws 34, are engaged by worms 40 driven from the low speed side of the reduction gears 37.

A polyphase, alternating-current generator 41 constitutes the transmitter or power end of a synchronous tie transmission. The slip rings of the transmitter 41 are connected to those of the motor 31, the stators of both machines being supplied from a common source of polyphase, alternating current. The transmitter 41 is connected by a chain and sprocket drive 42 to the shaft of the screwdown motor 35.

Figure 6:
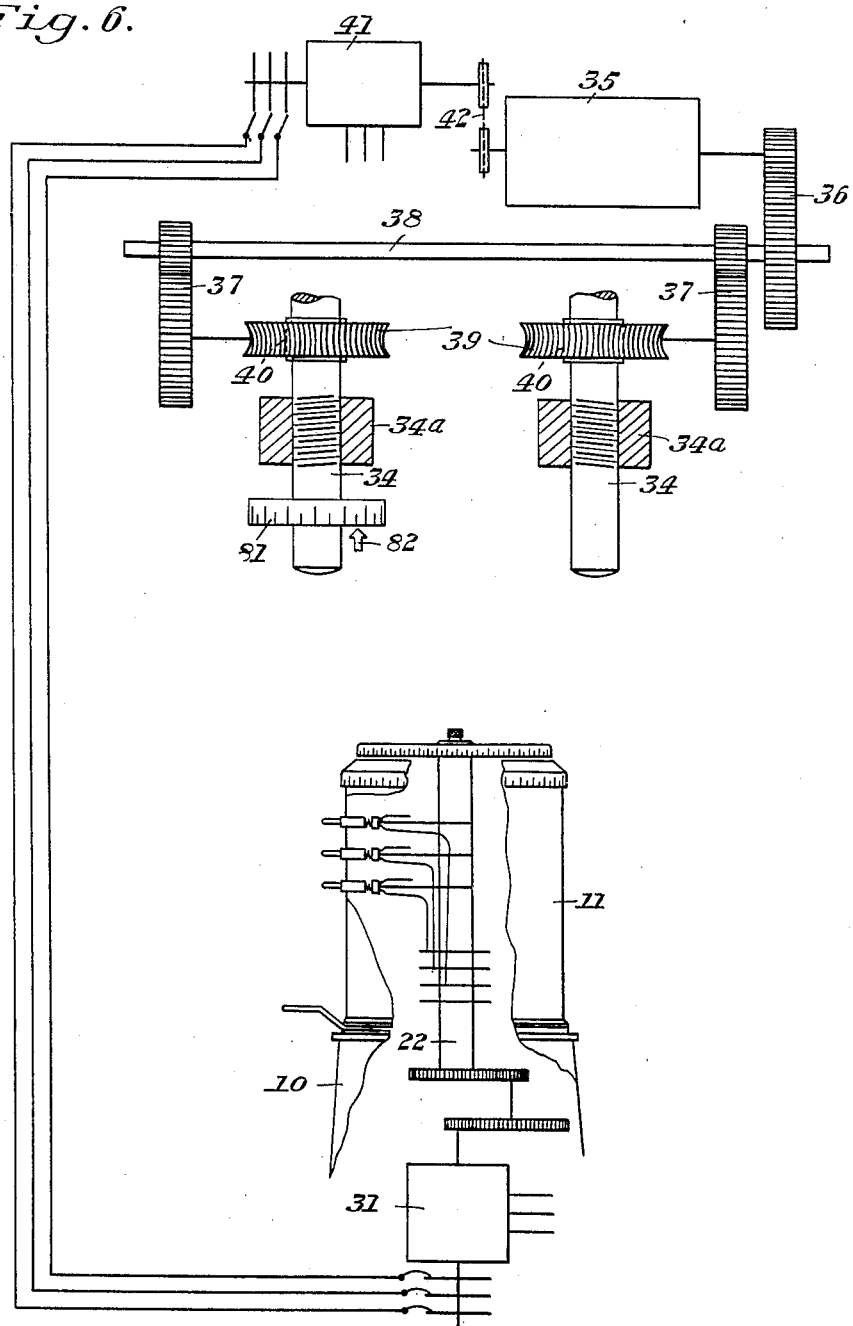
Figure 6 is a diagram illustrating schematically the connection between the mill screws and the control shaft drive.

It will be apparent from the foregoing description, and particularly from the showing in Figure 6, that the tubular shaft 22 will be turned, on adjustment of the screws 34, through an angle proportional to the extent of such adjustment. The ratio between the movement of the screws and that of the tubular shaft, of course, may be chosen to suit the requirements of a particular installation. The gears 25 and 26, together with the pinions 27 and 28, constitute a speed change mechanism which permits the ratio between screw movement and tubular shaft rotation to be altered.

Referring back again to Figures 1 through 3, the wall 14 of the turret 11 has a plurality of circumferential slots 43 adjacent the upper end thereof, extending around substantially 180° of the turret perimeter. Arms 44 having yokes 45 formed at one end thereof, extend radially of the tubular shaft 22, the yokes fitting about the shaft. The arms have handles 46 extending through the slots 43. The handles 46 have pointers 47 cooperating with scales 48 formed on the exterior of the turret wall 14 between slots 43. The handles 46 are attached to the arms 44 through pins 46a. Springs 49 on the pins 46a urge blocks 50 on the handles 46 into frictional engagement with the interior of the turret wall to releasably hold the handles and arms in adjusted position.

The arms 44 each carry a cam 51, and are rotatable about the tubular shaft 22 between the ends of the slots 43. To avoid ambiguity, the arms 44 will hereafter be referred to as cam arms.

Contact arms 52 are secured to the tubular shaft 22 above each of the cam arms 44. The contact arms are preferably arranged in a common plane containing the axis of the tubular shaft 22. Each contact arm 52 carries a fixed contact 53 and a moving contact 54. The latter is normally pressed against the former by a spring, but is provided with a roller 55 so that when the tubular shaft 22 turns, the roller 55 engages the cam 51 and opens the contact 54. This operation is utilized, as will be described more fully hereafter, to control the screw motor 35.

An insulating sleeve 56 is mounted adjacent the lower end of the tubular shaft 22. The sleeve 56 carries a plurality of slip rings 57 making sliding contact with fixed brushes 58. Axially extending straps 59 on the interior of the sleeve 56 provide terminals for the slip rings 57, whereby they may be connected to the contacts 53 and 54 of the arms 52, and the circuits thereof extended to auxiliary control apparatus mounted on a fixed support.

A handle 60 is secured to the bottom plate 13 of the turret and extends radially thereof, the ring 17 being recessed to permit its passage. It will be apparent that shifting of the handle 60 rotates the entire turret on the base 10 and moves the cam arms 44 relative to the contact arms 52, the position of the latter being fixed as long as the motor 31 is not operating. The periphery of the bottom plate 13 carries a graduated scale 60a cooperating with a fixed indicator on the cover 12. Since the turret may be turned in either direction from a neutral position by the handle 60, the scale 60a is marked in both directions from zero, corresponding to the selected neutral position. It will also be apparent that the position of any of the contact arms 44 may be adjusted individually by means of its handle 46.

The cap 16 has a graduated scale 61 and a pointer 62 on the head 15 cooperating therewith indicates at any time the position of the mill screws. The head 15 is provided with a pair of graduated scales 63, each extending substantially half way therearound. The two scales are graduated in conformity with the different ratios provided by the speed change mechanism 25, 26, 27 and 28. The portions of the turret wall 14 between the slots 43 are graduated to correspond with the graduations on the scale 63, but these graduations are not marked. They may be referred readily, however, to either of the scales marked on the head 15.

Figure 9:
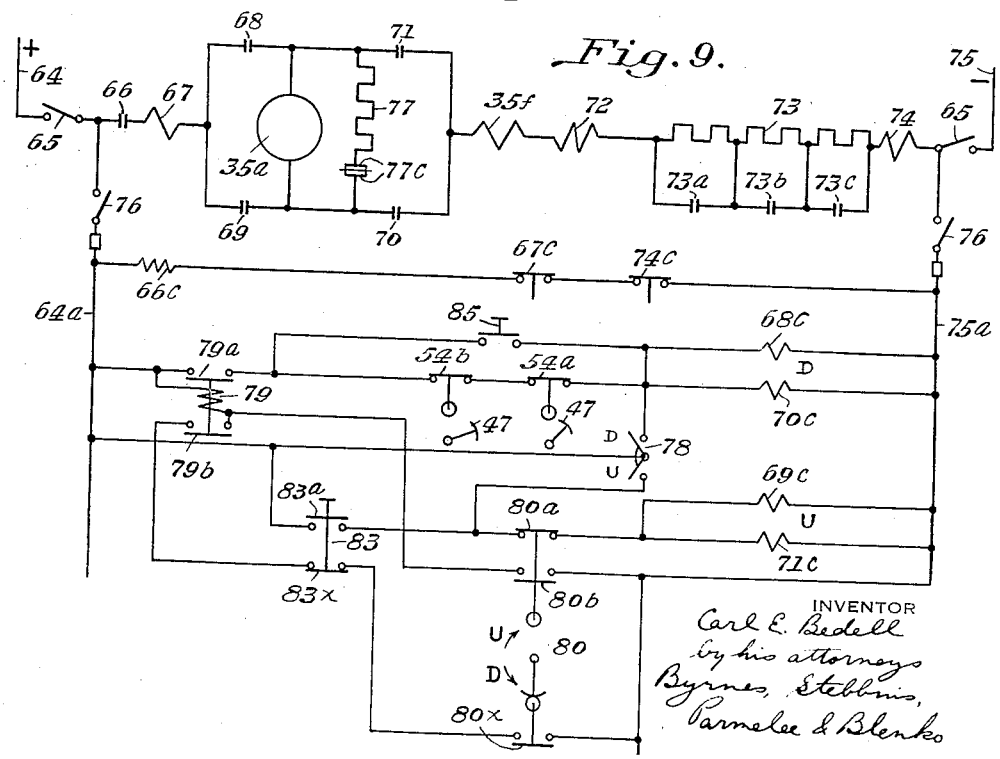
Figure 9 is a schematic diagram of a control circuit for the screwdown motor which may be employed in conjunction with the invention.

From the foregoing, it will be apparent that the invention provides a means for successively opening a plurality of contacts on operation of the mill screws. It remains to explain how the opening of the contacts stops the screw motor at the proper point in the travel of the screws. This explanation will be given with reference to Figure 9 of the drawings. It must be remembered, however, that the showing of Figure 9 is purely illustrative and the actual control circuits used with my invention may be widely different from those of Figure 9. Figure 9 represents merely a simplified form of conventional control circuit for a reversing mill motor, with the changes needed to utilize the automatic control device of my invention for stopping the motor at the proper time.

Referring to Figure 9, it will appear that the main circuit of the motor 35 extends from one terminal 64 of a supply source through one side of a manual switch 65 to a contactor 66 and thence through the winding of an overload relay 67 to the motor armature 35a through either one of two contactors 68 and 69. The circuit extends thence through either one of two contactors 70 and 71 through a series field winding 35f of the motor 35, a brake release coil 72 of standard construction, a starting resistor 73, the winding of an overload relay 74, the other side of the manual switch 65, to the other terminal 75 of the supply source. Contactors 73a etc. are provided for shunting sections of the resistor 73. Since any suitable accelerating scheme may be employed for starting the motor 35, no means are illustrated for operating these contactors 73a etc. A control bus comprising conductors 64a and 75a is connectible to the terminals 64 and 75 through a switch 76. If the overload relays 67 and 74 are deenergized sufficiently to permit their contacts 67c and 74c to close, a circuit will be established immediately for the operating coil 66c of the contactor 66, on the closing of the switch 65. The closing of the contactor 66 completes the motor circuit except for the closing of one of the pairs of contactors 68, 70, or 69, 71. A dynamic braking resistor 77 is connected across the armature 35a by contacts 77c which are opened when either of the contactors 68 and 69 are operated.

Figure 5:
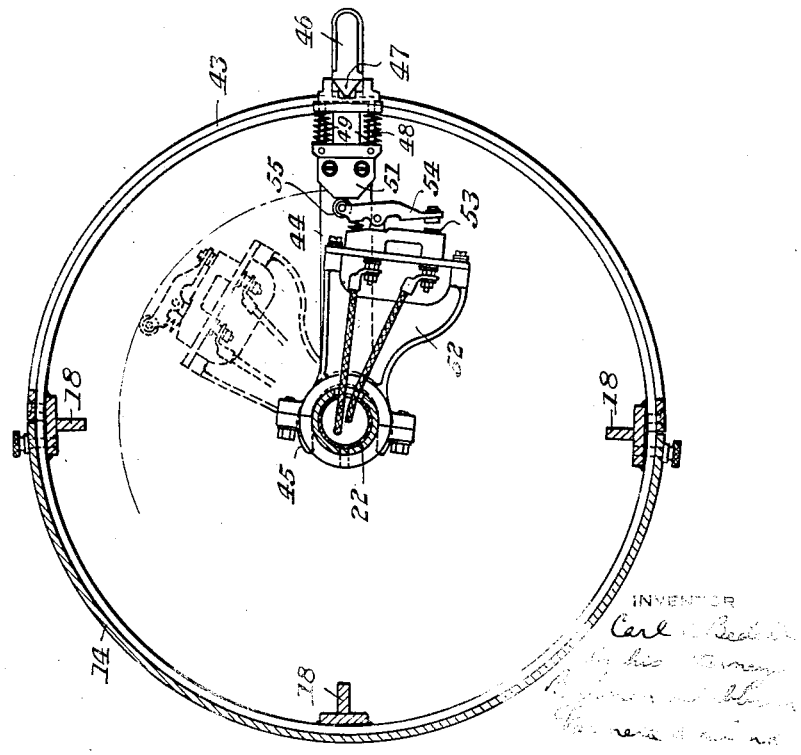
Figure 5 is a sectional view along the line V—V of Figure 3.

If the contactors 68 and 70 are operated, the motor 35 will rotate in one direction, which will be assumed to impart a downward movement to the screws, whereas if the contactors 69 and 71 are operated, the motor will rotate in the reverse direction, which will be assumed to raise the screws. The closing of the contactors is effected by their operating coils 68c, 69c, 70c and 71c. The coils 68c and 70c are connected in parallel and the coils 69c and 71c are similarly connected. A manual switch 78 is provided for simultaneously energizing both the coils of either pair. It will be noted that the coils 68c and 70c are controlled not only by the switch 78 but also by contacts 54a and 54b connected in series, and a front contact of a relay 79. Contacts 54a and 54b represent, in the schematic diagram, the contacts 54 of Figure 5. Only two of these contacts have been shown in the schematic diagram, although it will be understood that in practice, a sufficient number of contacts will be employed to automatically establish the proper setting of the mill screws for the desired number of passes. While Figure 9 shows the contacts 54a and 54b connected in series, this scheme of connections would probably not be employed in practice, but is shown here since it permits a relatively simple explanation of the operation of the invention.

The coils 69c and 71c are also controlled by a limit switch 80 which opens its contact 80a when the mill screws have been retracted to the maximum extent desired. This switch is preferably driven directly from the motor 35. One of the screws may be provided with a graduated disc 81 cooperating with a fixed pointer 82 to indicate the gauge of the mill pass at any time. The disc 81 is preferably adjustable on the screw 34 so that when the screws are all the way down, the disc may be set to the zero indicating position.

With power removed from the transmitter 41 to the motor 31, the cap 16 should be turned by hand so that the pointer 62 is opposite the zero mark on the scale 61 at this time. As the screws are retracted by reverse operation of the motor 35, the increasing gauge of the mill pass will be indicated by the reading of the scale 61, as well as by the disc 81. These scales may be graduated directly in thousandths of an inch, if desired.

If it is now assumed that the mill screws have been advanced by operating the manual switch 78 to energize the coils 68c and 70c, until the rolls are forced into tight engagement, the handles 46 may be set to the desired positions to determine the gauges of the mill on succeeding passes of the material therethrough. As previously stated, the scales 63 may be graduated in accordance with the range of adjustment of which the device is capable, depending on the position of the speed change mechanism. The two scales 63, obviously, will be of different ranges. Whichever scale is in use, the handles 46 may readily be set relative thereto. The handles may be conveniently assigned to successive passes in descending order and may be numbered 1, 2, 3, etc., as shown in Figure 2. When the handles 46 have been properly set for each pass, the mill screws may be retracted to provide the proper setting of the mill rolls for the first pass by operating the manual switch 78 to energize the coils 69c and 71c. The circuit for these coils includes the contact 80a of the limit switch 80, which is closed until the screws have been fully retracted. The switch 78 is left closed on its lower contact until the limit switch operates to open the circuit for the coils 69c and 71c. The switch 78 is then restored to neutral position.

Figure 7:
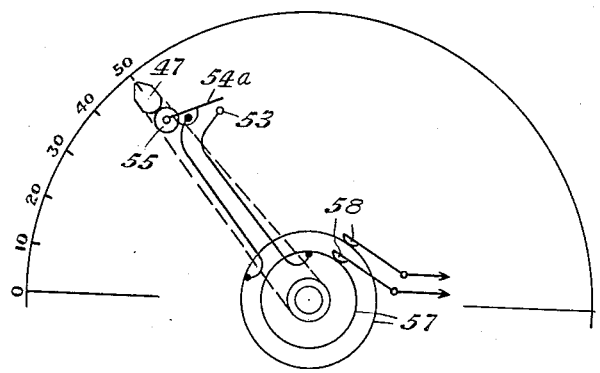
Figure 7 is a schematic view illustrating the operation of the invention to perform its intended function.

The operation of the limit switch 80 to open its contact 80a also closes a contact 80b. This completes an energizing circuit for the relay 79 which operates immediately to close its contacts 79a and 79b. The closing of the contacts 79b completes a locking circuit through a back contact 83x of a push button 83 and a contact 80x of the limit switch 80, which is closed except when the mill screws are in their farthest advanced position. The closing of contacts 79a completes a circuit for the coils 68c and 70c, including the contacts 54a and 54b etc. The screw motor, therefore, immediately reverses and advances the screws from their extreme retracted position, toward the position for the initial pass. This exact condition is determined, of course, by the setting of No. 1 arm 44 of the control device. When the contact on No. 1 arm 52 is opened by engaging the cam on No. 1 arm 44, the contact 54 thereof is opened, as illustrated diagrammatically in Figure 7. If the contact 54 of No. 1 arm 52 is represented by contact 54a of Figure 9, it will be apparent that the circuit for the coils 68c and 70c is opened by the operation thereof. The screw motor is thus stopped at the instant when the screws are properly adjusted for the first pass, as determined by the setting of No. 1 handle 46. The material is advanced through the mill by any convenient means, preferably by a conveyor which may be controlled manually by a switch 84 which, for convenience, may be mounted on the base 10 of the control device, as shown in Figure 1.

Figure 8:
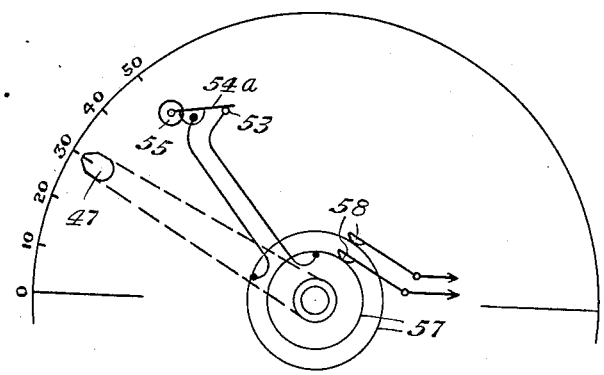
Figure 8 is a view similar to Figure 7 showing slightly different conditions.

When the material has passed through the mill, the screws, of course, must be readjusted for the second pass. This is accomplished by operating a push button switch 85. As shown in Figure 9, this switch temporarily short-circuits the contacts 54a etc. and, since the contact 79a remains closed, reenergizes the coils 68c and 70c to cause further down movement of the screws. The push button switch 85, of course, must be held closed long enough to permit the contact 54a to reclose on movement of its roller 55 past its cam 51, as shown diagrammatically in Figure 8. If desirable, the switch 55 may have a time delay release which will insure its remaining closed the required length of time, even though held down only for an instant. When the switch 85 opens, finally, operation of the screw motor continues until the next contact 54, for example, 54b as shown in Figure 9, is opened. The above described cycle of operations is repeated to stop the screw motor automatically and to restart it manually, for each set of arms and contacts.

When the rolling has been completed, further downward movement of the screws will cause the limit switch 80 to open its contact 80x to open the locking circuit of the relay 79. The same result follows if the push button switch 83 is actuated to open its back contact 83x. The latter operation also closes the front contact 83a of the switch 83, which energizes the coil 69c and 71c to reverse the screw motor and retract the screws. This operation may also be effected by the switch 78 and, when completed, the apparatus is ready for a further rolling operation.

The dual adjustment of which the invention is capable is particularly important. In rolling sheets according to the usual practice, sheet bars are first subjected to a roughing down to form breakdowns. The breakdowns are then matched and rolled as a pack or pair. After some reduction, the pack may again be doubled if thin gauges are being rolled. It is necessary, therefore, for the roller to be able to control accurately the setting of the mill pass within a given range and also that the range of adjustment for the successive passes be shiftable up and down the gauge scale to accommodate the widely varying thicknesses of breakdowns, matched pairs and double packs. My invention provides the desired type of control. The adjustability of the handles 46 provides a simple and accurate control of the mill screws on successive passes in the same operation, that is, roughing or finishing. At the same time, the adjustment of the entire turret of the control device by means of the lever 60 permits shifting the operating range of the device bodily up or down the gauge scale. Any movement of the turret by the handle 60, of course, is indicated on the scale 63 so that the settings of the handles 44 continue to show exactly the relative gauges for which they are adjusted. Movement of the handle 60, of course, changes the settings of all the handles 46 by precisely the same amount in the same direction.

While I have illustrated and described herein but a single preferred embodiment of the invention, it will be recognized that many changes therein may be made without departing from the spirit of the invention or the scope of the appended claims.

I claim:

1. An electrical control device comprising a turret, a shaft rotatably mounted within said turret, contact arms secured to said shaft, and arms carrying contact operating means rotatable about said shaft, said last-mentioned arms having adjusting handles projecting from said turret.

2. The apparatus set forth in claim 1 characterized by a rotatable mounting for said turret and means for shifting the turret angularly on said mounting.

3. In an electrical control device, a rotatable shaft, a plurality of arms secured to said shaft, and movable contacts carried by said arms, a turret enclosing said shaft and arms, a plurality of additional arms adjustable about said shaft having cams cooperating with said movable contacts, said turret having circumferential slots, and said last-mentioned arms having adjusting handles projecting through said slots.

4. In a control device, a shaft, a plurality of controller arms rotatable about said shaft, a case enclosing said shaft, said arms having handles projecting through circumferential slots in the case, said handles having spring pressed friction blocks engaging the interior of the case for releasably holding the arms in adjusted position.

5. A device for controlling the operation of an electrical apparatus adapted to be operated intermittently comprising a turret, a shaft rotatably mounted in said turret, a plurality of contacts adapted to be successively actuated, each including a movable member and operating mechanisms therefor including means engaging said movable members, said contacts and operating mechanisms being mounted for cooperation on said turret and shaft, and means for driving said shaft in accordance with movement of the apparatus being controlled.

6. A device for controlling the operation of an electrical apparatus adapted to be operated intermittently comprising a relatively fixed turret, a shaft rotatably disposed therein, contacts on one of said elements and contact operating means on the other, means for adjusting the relative positions of the contacts and their operating means, and means for rotating said shaft relative to said turret in accordance with the movement of the apparatus to be controlled, whereby relative movement of the shaft and turret causes operation of said contacts.

7. In a control device, a cylindrical case, a plurality of adjusting arms projecting through circumferential slots in said case, a shaft rotatable in the case, contacts and operating means therefor on said arms and shaft, a head rotatable on said case and having a plurality of graduated scales about the periphery thereof, said case having graduations between slots, and means for locking the head on the case so that graduations of one of the scales on the head are in alinement with the graduations on the case.

8. The combination with a rolling mill having roll-adjusting screws and a motor for driving said screws, of a control device for said motor, to position said screws precisely for successive passes of material through the mill, said control device including a shaft, a plurality of contacts mounted thereon for controlling said motor, a housing enclosing said shaft, and adjustable levers projecting outwardly from said housing for controlling the operation of said contacts, whereby the setting of the mill screws for successive passes of material through the mill may be pre-set.

9. A control device for the screwdown motor of a rolling mill, comprising a shaft driven in accordance with the operation of said motor, a housing enclosing the shaft, a plurality of arms rotatable on the shaft and projecting outwardly of the housing, a plurality of arms fixed to and rotating with the shaft, and a plurality of contacts effective when operated to stop the screwdown motor, operating means for each of said contacts, said contacts and operating means being mounted for cooperation on said fixed and rotatable arms, whereby the position of the mill screws for successive passes of material through the mill may be accurately pre-set.

10. The apparatus defined by claim 6 characterized by the fact that said turret is supported for rotation as a unit relative to said shaft.

11. The apparatus defined in claim 6 wherein said turret is mounted for rotation about said shaft, and a cap fixed to said shaft has a graduated scale cooperating with a pointer on said turret.

12. The apparatus defined by claim 5 wherein said turret has a rotatable head provided with a plurality of scales cooperating with said contact operating mechanism, and means for locking said head to position one of said scales for cooperation with said contact operating means.

13. The combination with a rolling mill having roll adjusting screws and a motor for driving said screws, of a control device for said motor including a plurality of adjustable contact-actuators movable about a fixed axis, means for manually adjusting the position of each of said actuators relative to the others about said axis, a plurality of contacts rotatable about said axis adapted to engage said actuators respectively, and means for moving the contacts in accordance with the movement of said screws.

14. The combination with a rolling mill having roll-adjusting screws and a motor for operating the screws, of a device for controlling the motor having a plurality of contacts, means for moving said contacts in exact accordance with the movement of the adjusting screws, and actuators for said contacts, said actuators being movable in the path of said contacts respectively, for individually adjusting the time of the operation of each of said contacts relative to the operations of the others.

15. The apparatus defined by claim 14 characterized by means for changing the ratio between the screw movement and the contact movement.

16. A device for controlling an electric motor, said device having a plurality of contacts, means actuated in accordance with the rotation of the motor for operating said contacts successively, said contacts being movable relative to each other whereby the times of their operations may be varied, and means for simultaneously moving all said contacts without changing the existing relation between the positions of the several contacts.

CARL E. BEDELL.